United States Patent [19]

Frank et al.

[11] Patent Number: 4,583,505
[45] Date of Patent: Apr. 22, 1986

[54] CONTINUOUSLY CHARGED FLYWHEEL TYPE POWER DELIVERY SYSTEM

[75] Inventors: Andrew A. Frank; Takashi Omitsu, both of Madison, Wis.

[73] Assignee: Aisin Seiki Kabushiki Kaisha, Japan

[21] Appl. No.: 651,462

[22] Filed: Sep. 17, 1984

[51] Int. Cl.$^4$ .......................... F02D 7/00; B60K 9/04
[52] U.S. Cl. .................................. 123/198 F; 60/718; 180/165
[58] Field of Search ............. 123/198 F, 481; 60/718; 180/165

[56] References Cited

U.S. PATENT DOCUMENTS

| | | | |
|---|---|---|---|
| 3,641,843 | 2/1972 | Lemmens | 180/165 |
| 3,771,311 | 11/1973 | Herbst | 180/165 |
| 4,061,055 | 12/1977 | Iizuka et al. | 123/198 F |
| 4,126,200 | 11/1978 | Miller et al. | 180/165 |
| 4,276,951 | 7/1981 | Smitly | 180/165 |
| 4,381,684 | 5/1983 | Himmelstein | 123/198 F |
| 4,471,668 | 9/1984 | Elsner | 180/165 |

Primary Examiner—Ira S. Lazarus
Attorney, Agent, or Firm—Banner, Birch, McKie & Beckett

[57] ABSTRACT

An improved control system and method for controlling the operation of a flywheel type power delivery system, such as used in an automotive vehicle. A predetermined maximum vehicle speed limit dictates the working displacement of a variable displacement engine to match efficient engine output to the power requirements of the system. Above a threshold vehicle speed of approximately 45 miles per hour, the flywheel is completely uncoupled from the system and vehicle propulsion is provided by direct coupling of the engine (at maximum displacement) through the continuously variable ratio transmission (CVT) to the vehicle driving wheels.

12 Claims, 4 Drawing Figures

CONTINUOUSLY CHARGED FLYWHEEL TYPE POWER DELIVERY SYSTEM

This application discloses and claims subject matter related to that disclosed in the concurrently filed and commonly assigned application of Andrew A. Frank, Ser. No. 651,166, which is incorporated herein by reference.

BACKGROUND OF THE INVENTION

This invention relates to flywheel type power delivery systems, such as used in motor vehicles, and more particularly, to a control system and method for efficiently operating such a power delivery system.

Conventional automotive power plant systems—wherein an engine is directly coupled to a transmission and drive line—operate on the basis of an energy creation concept. That is, only the amount of shaft energy needed to propel the vehicle at any given instant is "created" by the engine. Inherent inefficiencies in this type of system arise from the fact that the engine is called upon to deliver this energy over a fairly wide operating range, only a small portion of which typically will afford production of energy at maximum efficiency.

In an effort to improve the overally efficiency of automotive propulsion systems, flywheel type vehicles have been developed. U.S. Pat. Nos. 3,672,244 and 4,131,171 disclose two examples of such systems. In flywheel systems, shaft energy is intermittently produced by the engine over a narrower and more efficient operating range, and excess energy not required for immediate propulsion is stored as kinetic energy in a rotating flywheel of substantial mass. This stored energy typically is tapped when needed for propulsion, and the engine is recoupled to the flywheel to further "charge" it with kinetic energy when the flywheel has substantially slowed. The flywheel can be charged by regeneration from the vehicle during braking. Significant increases in system efficiency have been realized by utilizing this "energy management" concept.

Despite developments in flywheel type automotive vehicles, there still remains room for significant improvement in overall flywheel vehicle efficiency. Kemper, Elfes and Trachman of Vadetec Corporation recognized in an October, 1980 report prepared for Lawrence Livermore Laboratory entitled "Feasibility Study Of A CVT System For An Internal-Combustion Engine/Flywheel-Drive Vehicle" that there exists a potential for a 100% improvement in system efficiency. To date this has not been realized. This invention represents a significant step toward achieving that goal.

SUMMARY OF THE INVENTION

It is therefore an object of the present invention to provide a flywheel type power delivery system and control scheme therefor which maximizes the efficient "creation" and "management" of energy.

Another object of the invention is to provide such a system and control scheme which are well-suited for automotive applications.

These and other objects of the invention are accomplished by providing a method of controlling the operation of a flywheel type power delivery system having a flywheel, an internal combustion engine, and a continuously variable ratio transmission (CVT) operatively coupled to the flywheel for delivering power to an output shaft. A desired maximum output shaft speed limit is predetermined, and the working displacement of the engine is adjusted in proportion to the output shaft speed limit, whereby the efficient power output of the engine is tailored to the power requirements of the system.

The invention also encompasses apparatus for carrying out the prescribed method, and the application of these principles to controlling a motor vehicle.

BRIEF DESCRIPTION OF THE DRAWINGS

The novel features of the invention are set forth with particularity in the appended claims, but the invention will be understood more fully and clearly from the following detailed description of the invention as set forth in the accompanying drawings, in which:

DETAILED DESCRIPTION

In the description that follows, the principles of the invention are described as applied to a motor vehicle. It is to be understood, however, that these principles are equally applicable to any type of power delivery system utilizing a prime mover, flywheel and CVT.

Figure 1:
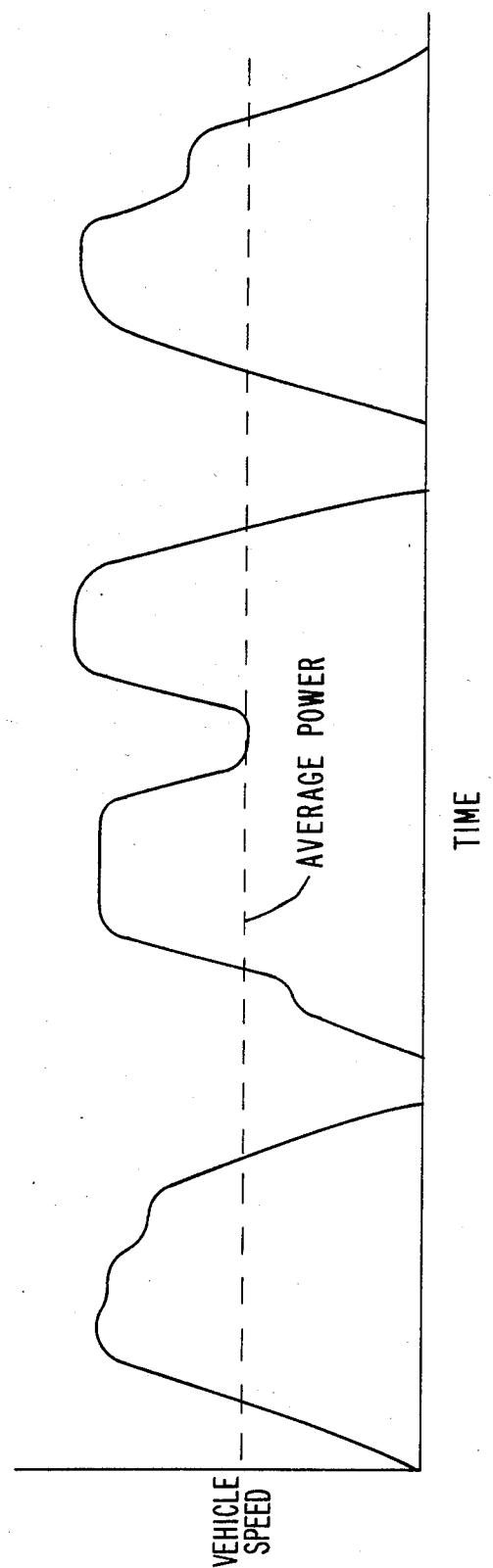
FIG. 1 is a plot of vehicle speed as a function of time.

Referring to FIG. 1, vehicle speed is plotted as a function of time, and represents a typical start and stop vehicle speed pattern during city driving. Obviously, the power required to propel the vehicle throughout this cycle constantly varies as vehicle speed and road load change. There is, however, an average power—indicated by the broken line in FIG. 1—which can be said to approximate the power requirements of the vehicle throughout this cycle. The average power will vary in accordance with the maximum vehicle speed limit. Thus, for any given speed limit, a corresponding average power can be assigned.

In the aforementioned related application Ser. No. 651,166, it is recognized that the efficiency of a flywheel type vehicle propulsion system could be significantly improved by controlling the delivery of power from the engine to the flywheel as a function of measured flywheel speed, to keep the speed of the flywheel within a range predetermined by the desired vehicle speed limit. The preferred embodiment disclosed therein involves the coupling and decoupling of the engine from the flywheel as the means of control. This invention embodies the same general concept disclosed therein, and involves the adjustment of engine power output as a function of vehicle speed limit, taking into account the above described relationship—illustrated in FIG. 1—between average power and vehicle speed limit. Instead of coupling and decoupling the engine from the flywheel as in the related application, this invention involves continuous delivery of power from the engine to the flywheel, as explained below.

Figure 2:
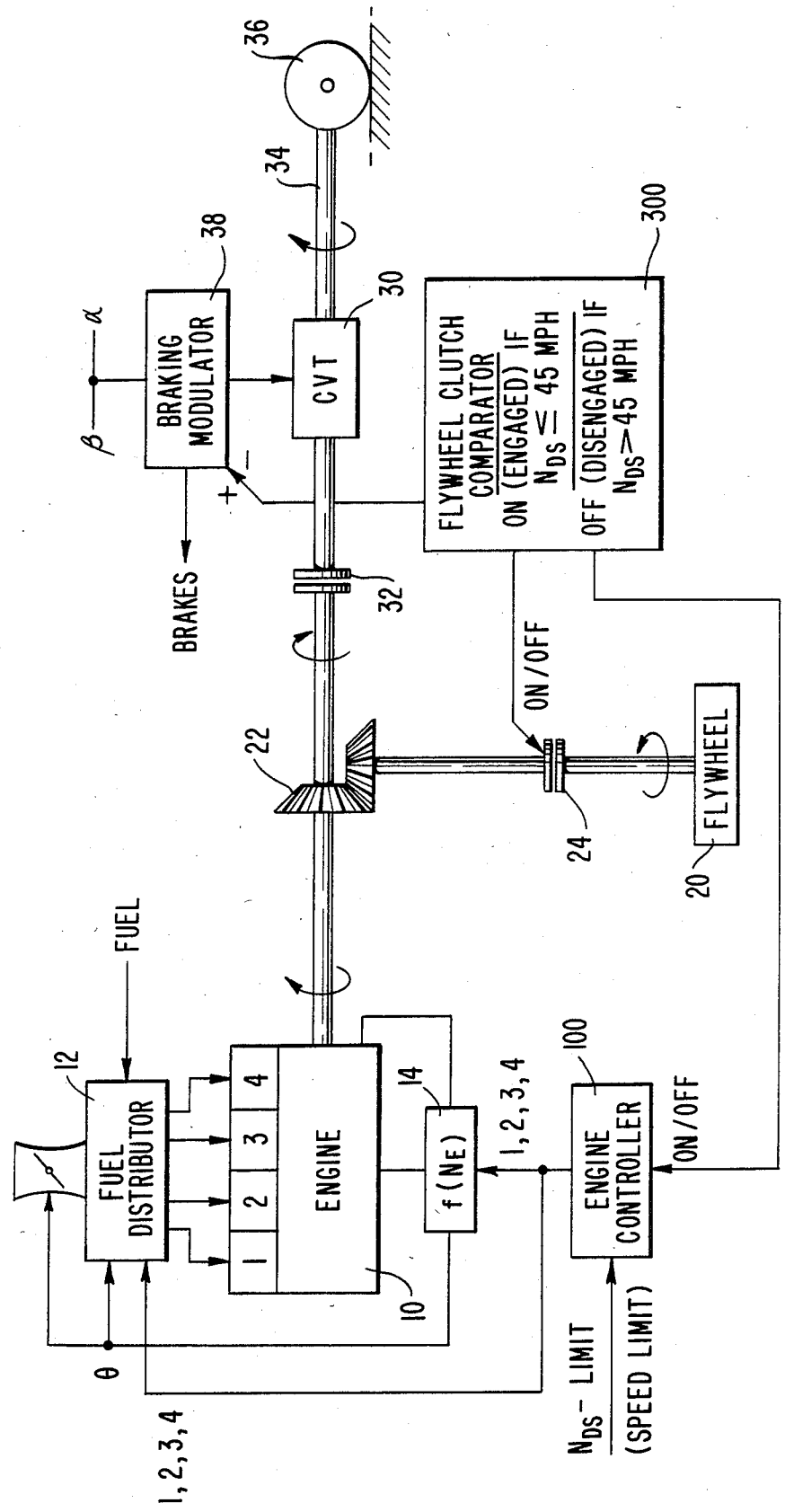
FIG. 2 is a schematic representation of an engine/flywheel/CVT vehicle propulsion system, and the control system therefor according to the invention.

Referring to FIG. 2 the basic components of a vehicular propulsion system are illustrated as an engine 10, a flywheel 20 and a continuously variable ratio transmission (CVT) 30. Engine 10 typically is an internal combustion engine of the variable displacement type, that is, one in which the working displacement of the engine can be varied to efficiently vary the power output. Examples of these are engines with fuel valves for each cylinder such that some or all of the cylinders can selectively burn fuel, or engines with mechanisms for selectively changing the displacement of the cylinders. The engine illustrated is of the type which is capable of running on 1, 2, 3 or 4 cylinders to vary power output. This engine also has a fuel delivery distributor 12 controlled by a function generator 14 in accordance with the measured speed of the engine $N_E$. This control scheme is described in my U.S. Pat. No. 4,459,878 (incorporated herein by reference), and yields highly efficient engine operation. $\theta$ is representative of the metered fuel quantity and, in the case of a gasoline engine, throttle position.

Power is delivered from engine 10 directly to flywheel 20. Flywheel 20 is driven through bevel gearing 22 and a flywheel clutch or coupling 24 whose operation is controlled as described below. Flywheel energy is delivered to CVT 30 via a vehicle stop clutch 32, and then via drive shaft 34 to two or more driving wheels 36 of the vehicle.

In accordance with the control scheme disclosed in U.S. Pat. No. 4,459,878, accelerator pedal position $\alpha$ may directly control CVT ratio such that engine operation is completely independent of any manual inputs by the operator of the vehicle. CVT 30 may be any type of transmission wherein transmission ratio varies substantially continuously over a range of ratios. The variable sheave diameter V-belt drive type of CVT described in my earlier U.S. Pat. No. 4,459,878 is a typical example of a suitable CVT.

It should be noted that in this or any other type of flywheel vehicle, the driving wheels preferably are the front wheels of the vehicle, or all of the wheels of the vehicle. This front wheel drive or four wheel drive configuration is important from a vehicle controllability and safety standpoint when one considers the effect of excessive dynamic braking by a propulsion system having the high degree of inertia of a rotating flywheel. Thus, if the vehicle simply were a rear wheel drive vehicle, excessive dynamic braking likely would cause rear wheel skidding and loss of directional stability of the vehicle in the absence of any sophisticated control system for moderating the dynamic braking effect. Such a system might include a braking modulator 38 responsive to movements of the accelerator pedal $\alpha$ and brake pedal $\beta$ for applying a small amount of mechanical braking to the front wheels at first, in combination with limited dynamic braking to the rear, progressively increasing to full mechanical braking.

As pointed out in the aforementioned related application, the concepts embodied in the present invention are based on the recognition that flywheel spin losses significantly detract from overall system efficiency. Such losses are proportional to the square of flywheel rotational speed. Thus, the objective is to maintain the speed of the flywheel at a minimum consistent with the ability of the flywheel to store and deliver needed kinetic energy for vehicle propulsion. The energy needs for vehicle propulsion will vary dependening on the maximum desired vehicle speed (i.e., vehicle speed limit). The present invention recognizes, therefore, that for optimum efficiency the flywheel operating speed range and the engine power output (a function here of displacement) should vary as a function of the vehicle speed limit. Ideally, each predetermined speed range should be as low as possible, as explained above, so as to minimize the flywheel and other system spin losses. This is accomplished by defining maximum and minimum flywheel operating speeds as follows:

$$\omega_{FL\text{-}MAX} = k\, R_{MAX}(N_{DS\text{-}LIMIT})$$

$$\omega_{FL\text{-}MIN} = k\, R_{MIN}(N_{DS\text{-}LIMIT})$$

where,
$\omega_{FL\text{-}MAX}$ = maximum flywheel operating speed
$\omega_{FL\text{-}MIN}$ = minimum flywheel operating speed
$k$ = a constant
$R_{MAX}$ = maximum transmission ratio
$R_{MIN}$ = minimum transmission ratio
$N_{DS\text{-}LIMIT}$ = maximum drive shaft rotational speed corresponding to a desired vehicle speed limit.

As previously discussed, the flywheel can also be charged by regeneration from the vehicle during braking. In accordance with the invention, if the flywheel speed is maintained at a minimum, its capacity to charge during the braking cycle will be increased, thereby permitting maximum recovery of energy from the vehicle.

Referring again to FIG. 2, the above described principles now will be explained as applied to the control system of the invention. The initial controlling input to the system, $N_{DS\text{-}LIMIT}$ (i.e., vehicle speed limit), is applied to engine controller 100, which controls the number of operating cylinders 1–4 via fuel distrubutor 12 in accordance with the dialed-in speed limit. The resulting engine output power level is matched to the average power needs of the system, thereby keeping flywheel speed generally within the optimum speed range for the dialed-in speed limit.

Figure 3:
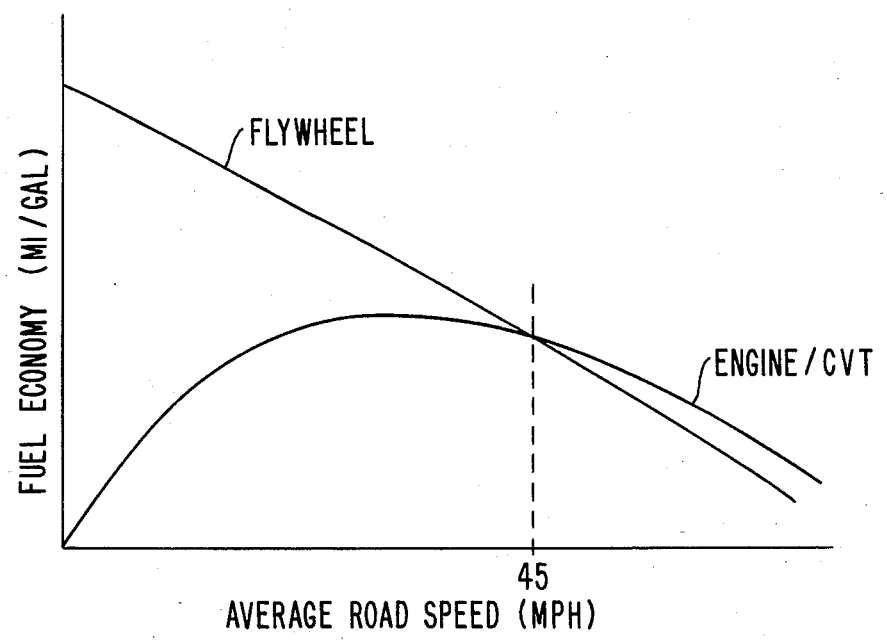
FIG. 3 is a plot of engine output torque as a function of engine speed.

Referring to FIG. 3, vehicle fuel economy there is plotted as a function of average vehicle road speed for flywheel and non-flywheel CVT power plants. This figure reveals the significant gain in efficiency by the use of a flywheel energy storage device at lower vehicle speeds. However, as vehicle speed approaches approximately 45 miles per hour, this efficiency advantage of a flywheel system is all but effectively lost. Accordingly, it is advantageous for vehicle speeds in excess of approximately 45 miles per hour to switch over from flywheel operation to direct engine-CVT propulsion without the use of a flywheel. This switchover speed is dependent upon the vehicle and type of driving and, in fact, may range from 20 mph to 50 mph.

Referring again to FIG. 2, this switchover is a accomplished by means of a flywheel clutch comparator 300, which compares measured drive shaft speed (which of course is proportional to vehicle speed) to the threshold value of 45 miles per hour. If measured drive shaft speed $N_{DS}$ is equal to or less than 45 miles per hour, flywheel clutch 24 remains engaged. Furthermore, engine controller 100 is turned on to control the engine in normal fashion, as explained above. If measured drive shaft speed exceeds an equivalent vehicle speed of 45 miles per hour, flywheel clutch comparator 300 disengages flywheel clutch 24, and engine controller 100 is turned off. This keeps all four cylinders firing, so that the flywheel 20 is effectively isolated from the system and power is delivered directly from the engine through the CVT to the driving wheels.

Flywheel clutch comparator 300 also effects inversion of the acceleration and braking signals $\alpha,\beta$ at the switchover point through braking modulator 38. This is required because, to effect similar vehicle acceleration, ratio changes in a flywheel system are the inverse of ratio changes in a non-flywheel system. This phenomenon is due to the inherent physical differences between the systems: a flywheel "appears" to a CVT as a constant speed energy source, whereas an engine "appears" as a vairable speed energy source. Thus, one must reduce transmission ratio to accelerate a vehicle equipped with a flywheel system, whereas one must increase transmission ratio to accelerate a vehicle equipped with an engine/CVT (non-flywheel) system.

Figure 4:
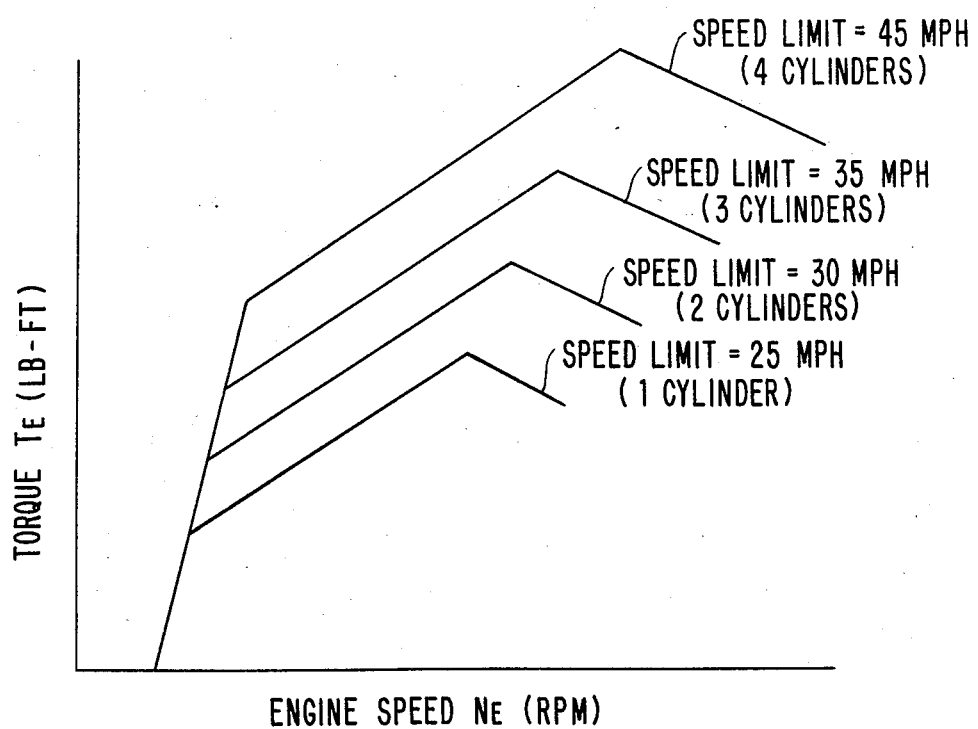
FIG. 4 is a graph of vehicle fuel economy as a function of average vehicle speed for two different types of vehicle propulsion systems.

FIG. 4 depicts ideal engine operating lines (for example, for minimum fuel consumption) as plots of engine output torque $T_E$ as a function of engine speed $N_E$. A more detailed description of such plots is contained in my U.S. Pat. No. 4,459,878. For each dialed-in speed limit, engine operation occurs along the respective operating line if vehicle speed is below 45 miles per hour. For vehicle speed above 45 miles per hour, all four cylinders are firing and the uppermost operating line is followed.

The above described control scheme quite simply and effectively accomplishes its primary objective of minimizing flywheel spin losses and maximizing overall system efficiency. As compared to the typical flywheel propulsion system wherein engine coupling and decoupling is the mode of control, the inventive control scheme eliminates inefficient engine idle; allows emission controls to be simpler because of more steady-state engine operation; eliminates an engine clutch and the losses associated with its operation; and permits direct engine drive of accessories which in prior flywheel systems had to be specially designed for direct flywheel drive. Any inherent roughness of the engine when operating at fewer than four cylinders is smoothed out by the inertia of the flywheel, so that vehicle driveability is not compromised.

The specific parameter values set forth in the preferred embodiment described above are in no way intended to limit the scope of the invention, it being apparent that these parameters will vary in accordance with engine, transmission and vehicle design, and desired behavior and performance. While an electronic control system has been schematically illustrated in the preferred embodiment, it is to be understood that any type of control system which functions in a particular manner may be used. It would appear that a control system incorporating many mechanical components would perhaps be the most reliable and least expensive alternative. Numerous other modifications of the invention will be apparent to those skilled in the art without departing from the true scope of the invention which is defined by the appended claims.

We claim:

1. In a method of controlling the operation of a flywheel-type power delivery system having an energy-storing flywheel, an internal combustion engine operatively coupled to the flywheel for delivering power to the flywheel, and a continuously variable ratio transmission operatively coupled to the flywheel for delivering power to an output shaft, the improvement comprising:
   predetermining a desired maximum output shaft speed limit; and
   adjusting the working displacement of the engine in proportion to the output shaft speed limit, whereby the efficient power output of the engine is tailored to the power requirements of the system.

2. A method according to claim 1 wherein the engine has a plurality of combustion chambers, and the step of adjusting the working displacement of the engine comprises limiting combustion to a predetermined number of said combustion chambers in proportion to the output shaft speed limit.

3. A method according to claim 2 wherein the power delivery system is the power plant of a motor vehicle, and the desired maximum output shaft speed limit is proportional to the desired maximum vehicle speed limit.

4. A method according to claim 1 wherein the power delivery system is the power plant of a motor vehicle and the desired maximum output shaft speed limit is proportional to the desired maximum vehicle speed limit.

5. A method according to claim 1 further including the step of maintaining the operating speed of said flywheel within a predetermined range.

6. A method according to claim 1 further including the step of maintaining the operating speed of said flywheel between a maximum and a minimum speed, said maximum and minimum speeds being determined as follows:

$$\omega_{FL-MAX} = k\, R_{MAX}(N_{DS-LIMIT})$$

$$\omega_{FL-MIN} = k\, R_{MIN}(N_{DS-LIMIT})$$

where,
$\omega_{FL-MAX}$=maximum flywheel operating speed
$\omega_{FL-MIN}$=minimum flywheel operating speed
$k$=a constant
$R_{MAX}$=maximum transmission ratio of said continuously variable transmission
$R_{MIN}$=minimum transmission ratio of said continuously variable transmission
$N_{DS-LIMIT}$=maximum rotational speed ofsaid output shaft.

7. In a flywheel-type power delivery system having an energy-storing flywheel, an internal combustion engine operatively coupled to the flywheel for delivering power to the flywheel, and a continuously variable ratio transmission operatively coupled to the flywheel for delivering power to an output shaft, the improvement comprising:
   displacement adjusting means for varying the working displacement of the engine; and
   displacement control means operatively coupled to said displacement adjusting means for effecting adjustment of said working displacement in proportion to a desired maximum output shaft speed limit, whereby the efficient power output of the engine is tailored to the power requirements of the system.

8. A system according to claim 7 wherein the engine has a plurality of combustion chambers, and said displacement control means limits combustion to a predetermined number of said combustion chambers in proportion to the output shaft speed limit.

9. A system according to claim 8 wherein the power delivery system is the power plant of a motor vehicle, and the desired maximum output shaft speed limit is proportional to the desired vehicle speed limit.

10. A system according to claim 7 wherein the power delivery system is the power plant of a motor vehicle, and the desired maximum output shaft speed limit is proportional to the desired vehicle speed limit.

11. A system according to claim 7 wherein the operating speed of said flywheel is maintained within a predetermined range.

12. A system according to claim 7 wherein the maximum and minimum operating speed of said flywheel is determined as follows:

$$\omega_{FL\text{-}MAX} = k\, R_{MAX}(N_{DS\text{-}LIMIT})$$

$$\omega_{FL\text{-}MIN} = k\, R_{MIN}(N_{DS\text{-}LIMIT})$$

where,
- $\omega_{FL\text{-}MAX}$ = maximum flywheel operating speed
- $\omega_{FL\text{-}MIN}$ = minimum flywheel operating speed
- $k$ = constant
- $R_{MAX}$ = maximum transmission ratio of said continuously variable transmission
- $R_{MIN}$ = minimum transmission ratio of said continuously variable transmission
- $N_{DS\text{-}LIMIT}$ = maximum rotational speed of said output shaft.

* * * * *